United States Patent
Zaugg et al.

(10) Patent No.: US 10,940,819 B2
(45) Date of Patent: Mar. 9, 2021

(54) METHOD AND DEVICE FOR DETECTION OF THE DISPLACEMENT POSITION OF A MOTOR VEHICLE SEAT

(71) Applicant: Polycontact AG, Chur (CH)

(72) Inventors: Thomas Zaugg, Chur (CH); Joshua Lanter, Horw (CH)

(73) Assignee: POLYCONTACT AG, Chur (CH)

( * ) Notice: Subject to any disclaimer, the term of this patent is extended or adjusted under 35 U.S.C. 154(b) by 493 days.

(21) Appl. No.: 15/819,727

(22) Filed: Nov. 21, 2017

(65) Prior Publication Data

US 2018/0148011 A1 May 31, 2018

(30) Foreign Application Priority Data

Nov. 29, 2016 (CH) ..................................... 01568/16

(51) Int. Cl.
| | |
|---|---|
| *G01B 7/14* | (2006.01) |
| *G01D 5/14* | (2006.01) |
| *B60R 21/015* | (2006.01) |
| *B60N 2/06* | (2006.01) |
| *B60N 2/07* | (2006.01) |
| *B60N 2/02* | (2006.01) |

(52) U.S. Cl.
CPC .......... *B60R 21/01554* (2014.10); *B60N 2/06* (2013.01); *B60N 2/07* (2013.01); *G01D 5/145* (2013.01); *B60N 2002/0272* (2013.01); *B60Y 2400/3012* (2013.01)

(58) Field of Classification Search
CPC ......... G01B 7/14; B60R 21/015; B60R 21/16; B60N 2/02; B60N 2/06; B60N 2/07; B60N 1/02; G01D 5/14
See application file for complete search history.

(56) References Cited

U.S. PATENT DOCUMENTS

| | | | | |
|---|---|---|---|---|
| 4,909,560 A | * | 3/1990 | Ginn ........................ | B60N 2/06 296/65.15 |
| 6,921,107 B2 | * | 7/2005 | Mills .................... | B60N 2/0224 280/735 |
| 7,511,479 B2 | * | 3/2009 | Schuler ................ | G01D 5/2451 324/207.2 |
| 2004/0079175 A1 | * | 4/2004 | Dukart ..................... | G01G 7/02 73/862.391 |
| 2016/0074587 A1 | * | 3/2016 | Searle ............... | A61M 5/14248 604/189 |

FOREIGN PATENT DOCUMENTS

| | | |
|---|---|---|
| DE | 101 36 820 A1 | 2/2003 |
| JP | 2003-227703 A | 8/2003 |

* cited by examiner

*Primary Examiner* — Neel D Shah
(74) *Attorney, Agent, or Firm* — Buchanan Ingersoll & Rooney PC (57) ABSTRACT

A method for detecting the displacement position of a vehicle seat is described. When the vehicle seat is being displaced, a magnetic field-sensitive sensor device monitors a change of one magnetic field component and depending on the output signal which has been generated by the sensor device, a conclusion is drawn about the adjustment position of the vehicle seat. The magnetic field-sensitive sensor device is displaced relative to a measuring section using the magnetic field-sensitive device. An absolute value of the magnetic field strength of a magnetic field whose magnetic field strength changes essentially continuously along a longitudinal extension of the measuring section is detected and converted into an absolute displacement position of the vehicle seat.

11 Claims, 3 Drawing Sheets

METHOD AND DEVICE FOR DETECTION OF THE DISPLACEMENT POSITION OF A MOTOR VEHICLE SEAT

RELATED APPLICATION

This application claims priority under 35 U.S.C. § 119 to Swiss Patent Application No. 01568/16 filed in Switzerland on Nov. 29, 2016, the entire content of which is hereby incorporated by reference in its entirety.

FIELD

The present disclosure relates to a method for detecting the displacement position of a motor vehicle seat, and to a device which is suitable for implementing a related method.

BACKGROUND INFORMATION

Motor vehicles, such as passenger cars, are being increasingly equipped with safety gear such as front, side, knee and head airbags. This safety gear is designed to protect passengers in case of a collision and to reduce the risk of injury. Airbags must be deployed and inflated within a very short time interval.

For this purpose propellant charges are used which explosively fill the airbag and allow it to emerge from the respective enclosure in the vehicle interior. The arrangement of the airbags and the choice of their size constitute a compromise which is intended to take into account the different size and the different weight of the vehicle passengers. In front airbags the airbag can be inflated to different degrees depending on the seat position of the motor vehicle passengers. Thus a front airbag will be more dramatically inflated for a large passenger whose seat is located accordingly farther away from the dashboard than in the case of a smaller passenger whose seat has been displaced into a position nearer the dashboard. This is designed to prevent a vehicle passenger who is located nearer the dashboard from being injured by the kinetic energy of an airbag which has been inflated with full energy. The inflation energy for the airbag is controlled accordingly via graduated amounts of the propellant which are being ignited. To control the inflation energy for the airbag it is therefore desirable to have knowledge of the distance of the vehicle seat from the dashboard.

In the past there were various mechanical and electromechanical systems in use to determine the position of the vehicle seat. Mechanical and electromechanical detector systems are however susceptible to wear and can lead to unpleasant, undesirable noise when the vehicle seat is being adjusted.

In the course of increasing automation, motor vehicles have been equipped with electrical and electronic components which assume the function of the earlier mechanical and electromechanical sensor apparatus. Proximity-type sensors are known by which the relative position of two components which can be displaced to one another can be detected in order to generate a corresponding control signal therefrom. In the case of the vehicle seat, the components which can be displaced relative to one another are for example a bottom rail which is mounted on the vehicle floor and a top rail which is securely joined to the vehicle seat and which can be linearly displaced along the bottom rail. The two rails, specifically the lower rail and the upper rail, are called the seat rail overall.

To ascertain the relative position of the two rails, for example, on the guide rail a magnetic strip can be attached along which a Hall sensor which is connected to the seat rail can be displaced. The magnetic strip, as described in U.S. Pat. No. 4,909,560, can change its polarity several times along its lengthwise extension. In the relative displacement along the magnetic strip, depending on the magnetic pole which has just been detected, the output signal of the Hall sensor changes. This enables incremental detection of the relative position of the vehicle seat. For ascertaining the absolute displacement position of the vehicle seat however the initial point of the measurement must be established. Since in modern motor vehicles when the ignition is turned off all onboard electronics are also disconnected from the power supply, this "zero point information" may not be preserved. In such a system the sensor arrangement is re-initialized each time the vehicle ignition is turned on to ascertain the initial position of the displacement of the vehicle seat.

A position sensor based on a Hall sensor which is known from DE-101 36 820 allows recognition of two seat positions, front and back, according to a small or a large distance of the vehicle seat from the dashboard. In order to achieve a Hall sensor signal which can be evaluated and which is as large as possible, the two documents suggest keeping the distance between the magnetic poles and the surface of the Hall sensor as small as possible. In conjunction with the known production and installation tolerances this can however lead to the Hall sensor and its housing grinding relative to the guide rail when the seat rail is being displaced. Aside from the unwanted development of noise and the increased resistance to displacement, this grinding contact can lead to damage and to a failure of the sensor system. The absolute displacement of the vehicle seat cannot be established with this sensor arrangement.

Japanese document JP 2003-227703 discloses a sensor arrangement which is mounted on the seat rail and which monitors a scanning sheet which is mounted on the guide rail. This sensor arrangement includes a Hall sensor, a biased magnet and a flux concentrating sheet which are mounted with a housing. For example, the housing has a U-shape, with a receiving gap for the scanning sheet which is to be monitored. The Hall sensor, the biased magnet and the flux concentrating sheets can be located on both sides of the receiving gap. One alternative version calls for all components of the sensor arrangement to be located on one side of the receiving gap. The flux concentrating sheet is used to concentrate the magnetic flux on the Hall sensor and is intended moreover to screen disruptive effects of outside magnetic fields. When the vehicle seat is being displaced from a "back" position into a "front" position, the scanning sheet travels into the receiving gap of the housing of the sensor arrangement. In this way the magnetic flux is changed by the Hall sensor and a signal is generated which can be assigned to one seat position. In this sensor arrangement, the housing for the sensor arrangement is relatively large and it is located very exactly with respect to the scanning sheet. The scanning sheet is also mounted separately on the guide rail; which raises the installation cost. With this sensor arrangement only two states of the position of the vehicle seat, specifically front or back, can be detected. Absolute determination of the displacement path of the vehicle seat is not possible with this sensor arrangement.

SUMMARY

A method is disclosed for detecting a displacement position of a vehicle seat, comprising: monitoring, as the vehicle seat is being displaced, via a magnetic field-sensitive sensor device, a change of one magnetic field component generating an output signal by the sensor device; assessing an adjustment position of the vehicle seat based on the output signal; displacing the magnetic field-sensitive sensor device in a vicinity of at least one ferromagnetic component relative to a measuring section which extends parallel to one displacement direction of the vehicle seat and has a length which corresponds at least to a maximum displacement length of the vehicle seat; detecting, via the magnetic field-sensitive device, an absolute value of the magnetic field strength of a magnetic field whose magnetic field strength changes essentially continuously along a longitudinal extension of the measuring section, at a position of the measuring section which corresponds to a displacement position of the vehicle seat; and
converting the detected magnetic field strength into an absolute displacement position of the vehicle seat.

A device is also disclosed for detecting a displacement position of a vehicle, the device comprising: a magnetic field-sensitive sensor device and at least one permanent magnet for generating a magnetic field, whose change along a displacement length of a vehicle seat is detected with the magnetic field-sensitive sensor device to assess an adjustment position of the vehicle seat from an output signal of the sensor device; and a seat rail having a top rail and a bottom rail, on which there is arranged a measuring section whose length corresponds at least to a maximum displacement length of the vehicle seat, the magnetic field-sensitive sensor device being displaceable relative to a longitudinal extension of the measuring section when the vehicle seat is being displaced, the at least one permanent magnet along the measuring section being arranged for generating a magnetic field along the measuring section with an essentially continuously changing magnetic field strength whose absolute value is detectable at one displacement position by the magnetic field-sensitive sensor device, the absolute value of the magnetic field strength being converted into an absolute displacement position of the vehicle seat during operation.

BRIEF DESCRIPTION OF THE DRAWINGS

Other advantages and features will become apparent from the following description of schematics of exemplary embodiments of the device as claimed. To enhance understanding the same parts are each provided with the same reference numbers for schematic figures which are not to scale in the following figures, wherein:

DETAILED DESCRIPTION

A device for detecting the absolute displacement position of a vehicle seat is disclosed which has a compact construction and allows unhindered adjustment of the position of the vehicle seat. The device can be durable and largely wear-free. The sensor device can be simple and economical in structure and allow simple installation.

A method is disclosed for detecting the absolute displacement position of vehicle seat which delivers information which is as accurate as possible about the displacement path of the vehicle seat in order, on that basis, to be able to control for example the degree of inflation of airbags. The method can be simple and reliable to implement and can reproduce the displacement position of the vehicle seat as accurately as possible independently of the initialization of the sensor device.

In an exemplary method proposed for detecting the displacement position of a vehicle seat, as the vehicle seat is being displaced, using a magnetic field-sensitive sensor device, a change of one magnetic field component is monitored and depending on the output signal which has been generated by the sensor device a conclusion is drawn about the adjustment position of the vehicle seat. The magnetic field-sensitive sensor device is displaced in the vicinity of at least one ferromagnetic component relative to a measuring section which extends parallel to one displacement direction of the vehicle seat and has a length which corresponds at least to a maximum displacement length of the vehicle seat. Using the magnetic field-sensitive device, an absolute value of the magnetic field strength of a magnetic field whose magnetic field strength changes essentially continuously along the longitudinal extension of the measuring section is detected at a position of the measuring section which corresponds to the displacement position of the vehicle seat. The detected magnetic field strength is then converted into an absolute displacement position of the vehicle seat.

With the method as disclosed, along a measuring section which corresponds to the displacement path at the displacement site of the vehicle seat, an absolute value of the magnetic field is detected and converted directly into an absolute displacement position of the vehicle seat. To do this, the magnetic field-sensitive device can be set once by the manufacturer to the vehicle-specific conditions, such as for example the distance of one seat rail from the dashboard, the length of the displacement distance, minimum and maximum value of the magnetic field strength along the measuring section. The magnetic field-sensitive device which has been tuned once to the specific vehicle conditions generally need no longer be initialized after its installation. The absolute adjustment position of the vehicle seat which has been determined via the detected absolute magnetic field strength is immediately available after activating the ignition of the vehicle. Turning off the onboard electronics has no effect on the absolute measurement which is being taken again immediately after re-activation of the onboard electronics. Thus information about the effective, absolute displacement position of the vehicle seat is continuously available, for example in order to control the degree of inflation of airbags in the motor vehicle. In exemplary embodiments, not only two positions of the vehicle seat, specifically front and back, are determined. The method as disclosed can allow a determination of the absolute displacement position of the vehicle seat within the scope of the resolution which is dictated by the magnetic field strength and the magnetic field-sensitive device. The resolution accuracy can be for example less than 20 mm.

In an exemplary version of the method, the magnetic field can be generated along the measuring section using at least one permanent magnet which is located along the measuring section. In doing so the magnetic field strength can be detected using a Hall sensor whose at least one magnetic field-sensitive measurement surface is permeated essentially vertically by the field lines of the generated magnetic field. Permanent magnets with different magnetic field strengths are available. Permanent magnets which can be used have for example a magnetic flux density from 0.3 T to 1.5 T. By using permanent magnets the magnetic field which has been applied along the measuring section can be generated independently of an energy source. Hall sensors are available in different versions and sensitivities. They are long-lived, durable and reliable. For example, differential Hall sensors can also be used to preclude design-induced disruptive effects.

In another version of the method which is based on the use of a Hall sensor, the magnetic field along the measuring section can be produced using two permanent magnets which are located on the end regions of the measuring section. The two permanent magnets are aligned such that they border two ferromagnetic components with magnetic poles which are opposite one another. With the Hall sensor the magnetic field strength can be detected in a longitudinal gap between the two ferromagnetic components. The two permanent magnets on the end regions of the measuring section in the longitudinal gap generate a magnetic field whose magnetic field strength first of all decreases essentially continuously proceeding from one permanent magnet along the measuring section. In a region which is located conventionally roughly in half of the measuring section the vector of the magnetic field strength reverses its direction due to the reversed polarization of the second permanent magnet, and the magnetic field strength which has been measured by the Hall sensor becomes negative. The nearer the Hall sensor along the measuring section is brought to the second permanent magnet, the "more negative" the detected absolute magnetic field strength becomes. (The absolute value of the magnetic field strength increases as the distance of the Hall sensor from the second permanent magnet decreases). Thus, with the Hall sensor in the longitudinal gap between the two ferromagnetic components along the measuring section the absolute value of the magnetic field strength at the respective displacement site of the vehicle seat can be detected. The Hall sensor which has been tuned to the respective conditions for the motor vehicle can convert the detected magnetic field strengths directly into information about the absolute displacement position of the vehicle seat.

Another version of the process can provide for the Hall sensor in the displacement of the vehicle seat to be displaced in relative terms in a longitudinal gap which is bordered by two sheets, preferably, for example, steel sheets, which run essentially parallel to one another and which form side boundaries of the measuring section and are fastened to a top rail or to a bottom rail of a seat rail for the vehicle seat. In this version the Hall sensor and the measuring section form separate structural units which can be fastened to the seat rail.

In another version of the method, when the vehicle seat is being displaced the Hall sensor is displaced in relative terms in a longitudinal gap which is bordered on the one hand by a top rail or a bottom rail of the seat rail and on the other hand by a ferromagnetic sheet, preferably a steel sheet, which runs essentially parallel to the top rail or to the bottom rail, the ferromagnetic sheet forming a side boundary for the measuring section. In this version of the method one of two rails, specifically the top rail or the bottom rail, of the seat rail which consists of a ferromagnetic material forms one of the two boundary rails for the measuring section and for the longitudinal gap. The two permanent magnets in polarizations which are opposite one another are located on the end regions of the measuring section and border the top rail or the bottom rail of the seat rail and the ferromagnetic sheet which is formed by the side boundary of the measuring section.

In another version of the method, the magnetic field can be generated by a permanent magnet which is located stationary with respect to the Hall sensor. The magnetic field strength which is being detected by the Hall sensor along the measuring section can be changed essentially continuously here by a distance between the permanent magnet and a ferromagnetic component which changes essentially continuously along the measuring section. In this version the permanent magnet and the Hall sensor are located stationary to one another and can be displaced in relative terms jointly along the measuring section.

In one version of this method the Hall sensor and the permanent magnet which is located stationary with respect to the Hall sensor can be moved in relative terms jointly in a longitudinal gap which is bordered on the one hand by a top rail or a bottom rail of a seat rail and on the other hand by a ferromagnetic sheet which forms a side boundary for the measuring section and has a distance from the permanent magnet which changes continuously along the measuring section. The magnetic field of the permanent magnet which is located stationary with respect to the Hall sensor is influenced by the ferromagnetic sheet. The effect of the ferromagnetic sheet changes continuously with increasing or decreasing distance of the sheet from the permanent magnet. In this way the magnetic field strength or the magnetic flux is changed by the magnetic field-sensitive measurement surface of the Hall sensor with which in turn the respective detected absolute magnetic field strength can be converted into information about the absolute displacement position of the vehicle seat.

In one alternative version, the Hall sensor and the permanent magnet which is located stationary with respect to the Hall sensor can be displaced in relative terms along a ferromagnetic top rail or a ferromagnetic bottom rail of a seat rail such that a distance between the permanent magnet and the top rail or the bottom rail of the seat rail in the region of the measuring section is changed essentially continuously. In this version the Hall sensor and the permanent magnet are displaced parallel to a longitudinal extension of the ferromagnetic seat rail. Along the measuring section the top rail or the bottom rail of the seat rail are made such that the distance of the respective rail to the permanent magnet changes continuously, in particular increases or decreases. This can take place for example by a material coating which changes continuously along the measuring section on an outside surface of the respective rail, which surface faces the Hall sensor and the permanent magnet which is located stationary. Alternatively, a rail which changes continuously in wall thickness along the measuring section could also be mounted on the outside surface of the respective rail, which surface faces the Hall sensor and the permanent magnet which is located stationary.

Regardless of the conversion of the continuous change in the distance between the permanent magnet and the respective rail, the Hall sensor and the permanent magnet which is located stationary with respect to the Hall sensor can be displaced in relative terms along a guide rail which runs parallel to the displacement direction and which forms a side boundary of the measuring section.

In exemplary versions of the method, the Hall sensor can be mounted on a top rail of a seat rail and can be displaced relative to a measuring section which is mounted stationary on a bottom rail of the seat rail when the vehicle seat is being displaced. This arrangement of the Hall sensor and the measuring section allows simple mounting and can be easily implemented in a large portion of known vehicle types.

Another version of the method can provide for a measurement signal which has been generated by the sensor device, in particular the Hall sensor, to be linearized for the evaluation and assignment of an absolute displacement position of the vehicle seat. Corresponding linearization algorithms known for a long time can be optimized for the sensor type used.

A device which is suitable for implementing the method as disclosed for detecting the displacement position of a vehicle seat has a magnetic field-sensitive sensor device and at least one permanent magnet for generating a magnetic field whose change along the displacement length of the vehicle seat can be detected with the magnetic field-sensitive sensor device in order to draw a conclusion about the adjustment position of the vehicle seat from an output signal of the sensor device. In the device, on one seat rail which includes a top rail and a bottom rail, there is a measuring section whose length corresponds at least to a maximum displacement length of the vehicle seat. The magnetic field-sensitive sensor device can be displaced relative to the longitudinal extension of the measuring section when the vehicle seat is being displaced. With at least one permanent magnet a magnetic field can be generated along the measuring section and it has an essentially continuously changing magnetic field strength along the measuring section. The magnetic field-sensitive device detects the absolute value of the magnetic field strength at one displacement position of the vehicle seat. The knowledge of the absolute value of the magnetic field strength can be converted into an absolute displacement position of the vehicle seat.

In an exemplary version, the magnetic field-sensitive sensor device is made as a Hall sensor with at least one magnetic field-sensitive measurement surface. The Hall sensor can be located with respect to a magnetic field which prevails along the measuring section such that its magnetic field-sensitive measurement surface is impinged by the field lines of the magnetic field essentially vertically. In this way the Hall sensor can generate an output signal which is as large as possible.

In another version, on the ends of the measuring section there can be two permanent magnets which are aligned such that they border two ferromagnetic components with magnetic poles which are opposite one another. The two ferromagnetic components border a longitudinal gap which forms the measuring section and in which the Hall sensor can be displaced in relative terms. This defined arrangement is durable and ensures a uniform relative linear adjustability of the Hall sensor along the measuring section.

The measuring section can be made as a separate component in which the longitudinal gap is bordered by two sheets, preferably steel sheets, which run essentially parallel to one another and which form side boundaries of the measuring section and are fastened to the top rail or to the bottom rail of the seat rail. The Hall sensor is arranged such that it projects into the longitudinal gap or its magnetic field-sensitive measurement field is located entirely within the longitudinal gap. This arrangement can largely screen external magnetic interference fields.

Another version of the device can provide for one of the two ferromagnetic components to be formed by the top rail or the bottom rail of the seat rail and the second ferromagnetic component to be formed by a ferromagnetic sheet, preferably a steel sheet, which runs essentially parallel to the top rail or to the bottom rail. The ferromagnetic sheet forms a side boundary for the measuring section. In this version the top rail or the bottom rail which are made ferromagnetic are used as the side boundary of the longitudinal gap of the measuring section. In this way one of the side boundary sheets can be omitted. The two permanent magnets in polarizations opposite another are located on the end regions of the measuring section and border the top rail or the bottom rail of the seat rail and the ferromagnetic sheet which forms the side boundary of the measurement distance. The characteristic of the magnetic field in the longitudinal gap corresponds to the characteristic which was already described.

In another version of the device, at least one permanent magnet can be located stationary with respect to the Hall sensor. One ferromagnetic component is located along the displacement distance of the vehicle seat such that its distance from the permanent magnet along the measuring section changes essentially continuously. The distance of the ferromagnetic component from the permanent magnet can change by for example 7 mm to 15 mm, preferably, for example, by roughly 10 mm, in the relative displacement from one end of the measuring section to the other end of the measuring section. The continuous change of the distance of the ferromagnetic component from the permanent magnet changes the influence of the component on the characteristic of the magnetic field. Accordingly, when the vehicle seat is being displaced, the magnetic field strength and the magnetic flux of the magnetic field of the permanent magnet located stationary to the Hall sensor also change, which magnetic field passes through and encounters the magnetic field-sensitive measurement field of the Hall sensor. The absolute value of the magnetic field is detected by the Hall sensor and can be converted into an absolute value of the displacement position of the vehicle seat.

In an exemplary version, the component which influences the magnetic field strength of the permanent magnet can be a ferromagnetic sheet which forms a side boundary for the measuring section and has a distance from the permanent magnet which changes continuously along the measuring section. The magnetic field of the permanent magnet which is located stationary with respect to the housing is influenced by the ferromagnetic sheet which is mounted in the manner of an inclined plane. The effect of the ferromagnetic sheet changes continuously with increasing or decreasing distance of the sheet from the permanent magnet. In this way the magnetic field strength or the magnetic flux is changed by the magnetic field-sensitive measurement surface of the Hall sensor with which in turn the respective detected absolute magnetic field strength can be converted into information about the absolute displacement position of the vehicle seat. For example, the ferromagnetic sheet is mounted on the bottom rail. The Hall sensor and the permanent magnet are then located on the top rail. But the ferromagnetic sheet can also be joined to the top rail. Then the Hall sensor and the permanent magnet are mounted on the bottom rail.

In another version the Hall sensor and the permanent magnet which is located stationary with respect to the Hall sensor can be arranged such that they can be moved in relative terms along the ferromagnetic top rail or the ferromagnetic bottom rail of the seat rail, the permanent magnet and the top rail or the bottom rail of the seat rail having a distance which changes essentially continuously in the region of the measuring section. For this purpose, for example along the measuring section there can be a continuously changing, in particular increasing or decreasing, material coating on an outside surface of the top rail or bottom rail, which surface faces the Hall sensor and the permanent magnet which is located stationary. Alternatively there can also be a rail which changes continuously in wall thickness along the measuring section on the outside surface of the respective rail which is facing the Hall sensor and the permanent magnet which is located stationary.

In another version of the device, there can be a guide rail which runs parallel to the displacement direction and along which the Hall sensor and the stationary permanent magnet can be displaced in relative terms. The guide rail can form a side boundary of the measuring section and it consists of a material, for example of a plastic, which does not adversely affect the magnetic field of the permanent magnet.

The Hall sensor can be mounted on a top rail of a seat rail while the measuring section can be located on the bottom rail of the seat rail. Of course reversed installation is also possible.

Figure 1:
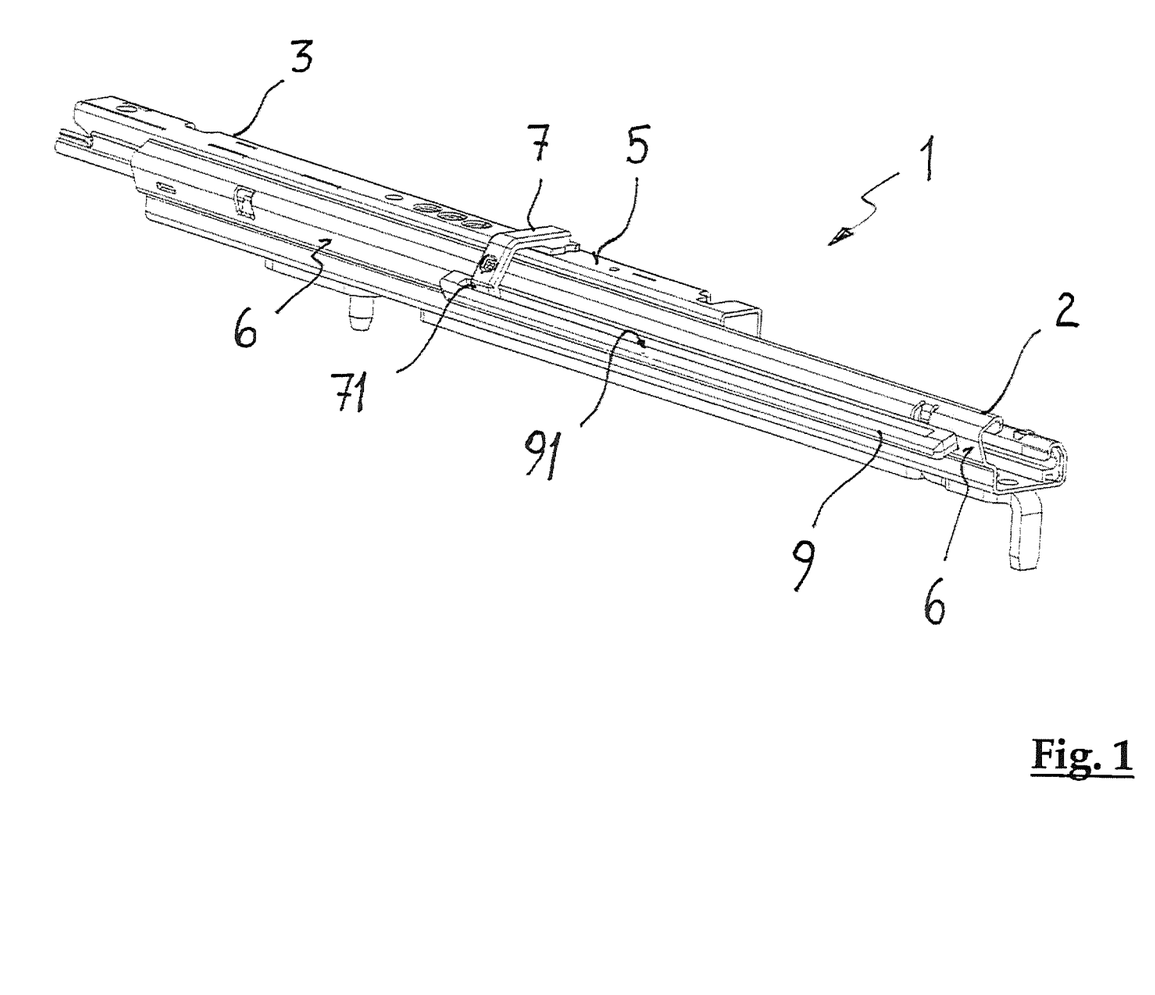
FIG. 1 shows a perspective view of a first exemplary embodiment of a device for detecting the displacement position of a vehicle seat.

FIG. 1 shows a first exemplary embodiment of a device for detecting the displacement position of a motor vehicle seat. The Figure shows a so-called seat rail 1 which includes a bottom rail 2 and a top rail 3. This seat rail 1 can be present in a double copy and is used to attach a vehicle seat which is not shown, for example the front seat of a motor vehicle. The seat rail 1 includes a stationary bottom rail 2 which is attached to the floor of the vehicle and a top rail 3 which can be displaced relative thereto, along the longitudinal extension of the bottom rail 2. The top rail 2 is connected to a vehicle seat which is not shown. It goes without saying that for each front vehicle seat there are two bottom rails and two top rails. For reasons of clarity however FIG. 1 shows only one of the two rail combinations 2, 3. The bottom rail 2 and the top rail 3 include (e.g., consist) at least in part of a ferritic or ferromagnetic material, in particular for example a magnetizable steel. The free longitudinal end of the bottom rail 2 facing the foot space can be covered with a plastic covering cap which is not shown in order to minimize the risk of injuries on edges of the bottom rail 2. Reference number 5 labels an outside surface of the top rail 3. A side surface of the bottom rail 2 is labelled with reference number 6.

On the outside surface 5 of the top rail 3 there is a holder 7 for the magnetic field-sensitive sensor device, for example a Hall sensor. The latter can be displaced jointly with the top rail 3 relative to the bottom rail 2 in the direction of the seat adjustment. One free front end 71 of the holder 7 projects into a longitudinal gap 91 of a measuring section 9 which is located on one side wall 6 of the bottom rail 2 in the illustrated exemplary embodiment. It goes without saying that in an exemplary version, the holder for the Hall sensor can also be located on the side wall of the bottom rail and the measuring section on the top rail. Only one relative movement of the Hall sensor which is located on the holder 7 with respect to the measuring section 9 is decisive for the measurement process.

Figure 2:
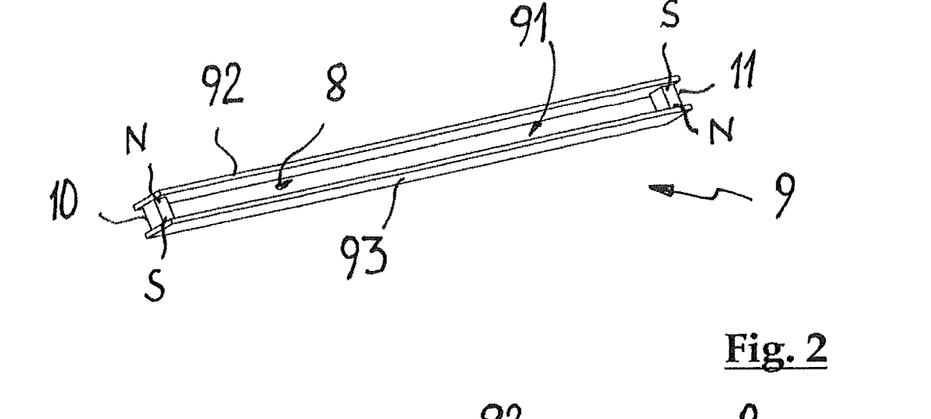
FIG. 2 shows a perspective schematic of a measuring section with the Hall sensor indicated.
Figure 3:
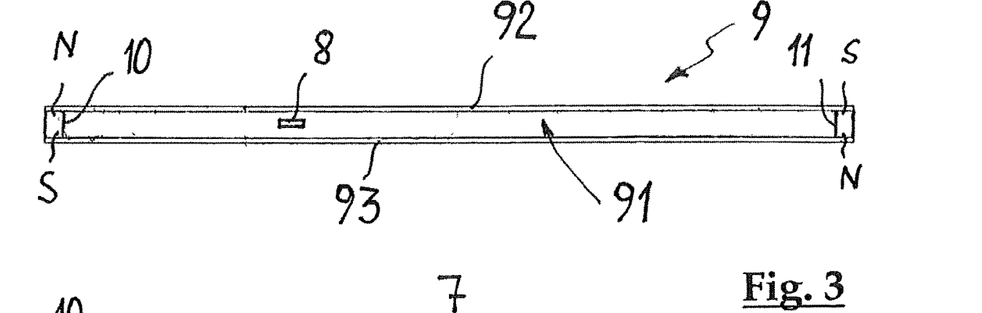
FIG. 3 shows a plan view of the measuring section.

FIGS. 2 and 3 schematically show the measuring section of the first exemplary embodiment. The measuring section 9 is bordered laterally by two ferromagnetic sheets 92, 93 which are located essentially parallel to one another. The length of the measuring section 9 or of the longitudinal gap 91 corresponds at least to the maximum displacement distance of the vehicle seat. On the two end regions of the measuring section 9 there are two permanent magnets 10, 11. The two permanent magnets 10, 11 are aligned such that they border the respectively same ferromagnetic sheet 92 and 93 with opposite magnetic poles N and S. This arrangement of the permanent magnets in the longitudinal gap 91 of the measuring section generates a magnetic field whose magnetic field strength continuously decreases for example proceeding from the permanent magnet 10 on the left end region of the measuring section 9 in the direction of the second permanent magnet 11 on the right end region of the measuring section 9. Roughly in the middle of the measuring section 9 the vector of the magnetic field strength reverses its direction. The magnetic field strength is then counted as negative. In the direction of the second permanent magnet 11 on the right end of the measuring section 9 the amount of magnetic field strength becomes greater again. Based on the original definition of the manner of counting the magnetic field strength the latter thus become more and more negative. The Hall sensor located in the longitudinal gap 91 of the measuring section is indicated with reference number 8. It goes without saying that the definition of the positive and negative magnetic field strength is a convention and can also take place oppositely to the illustrated version.

The Hall sensor 8 has at least one magnetic field-sensitive measurement field which is arranged such that it is penetrated essentially vertically by the field lines in the longitudinal gap 91. The Hall sensor 8 detects an absolute value of the magnetic field strength in the longitudinal gap 91 of the measuring section 9 at the respective displacement site. The Hall sensor 8 can be set once for example by the manufacturer to the vehicle-specific conditions, such as for example the distance of one seat rail from the dashboard, the length of the displacement distance, and minimum and maximum value of the magnetic field strength along the measuring section. In this way the absolute value of the magnetic field which has been measured by the Hall sensor 8 can be converted into absolute values of the displacement position of the vehicle seat. The Hall sensor 8 which has been tuned once to the specific vehicle conditions generally need no longer be initialized after its installation.

The absolute adjustment position of the vehicle seat which has been determined via the detected absolute magnetic field strength is immediately available after activating the ignition of the vehicle. Turning off the onboard electronics has no effect on the absolute measurement which is taken again immediately after re-activation of the onboard electronics. Thus information about the effective, absolute displacement position of the vehicle seat after activating the ignition is continuously available, for example in order to control the degree of inflation of airbags in the motor vehicle. In contrast to known methods, with an exemplary device as disclosed not only two positions of the vehicle seat, specifically front and back, are determined. The device and the method disclosed can allow determination of the absolute displacement position of the vehicle seat within the scope of the resolution which is dictated by the magnetic field strength and the Hall sensor. The resolution accuracy of the displacement position of the vehicle seat can be for example less than 20 mm.

Figure 4:
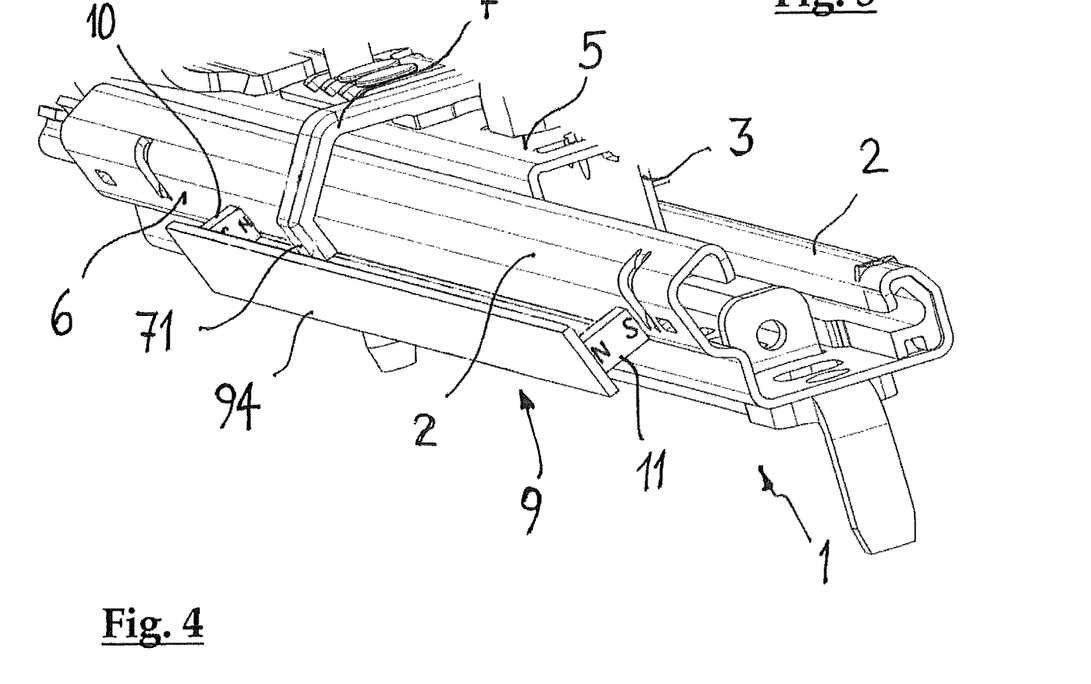
FIG. 4 shows a perspective view of a second exemplary embodiment of the device for detecting the displacement position of a vehicle seat.

FIG. 4 shows a second exemplary embodiment of the device for determining the displacement position of a vehicle seat. The measuring section 9 and the longitudinal gap 91 in which the Hall sensor mounted on the holder 7 can be moved in relative terms is in turn bordered by two ferromagnetic components which are essentially parallel to one another and to the displacement direction of the vehicle seat. The two components are on the one hand a ferromagnetic sheet 94 which forms one lateral boundary of the measuring section 9, and on the other hand the side wall 6 of the bottom rail 3. When the vehicle seat is being moved along the bottom rail 3 the Hall sensor which is located over the holder 6 on the top rail 2 is displaced lengthwise in the longitudinal gap 91 of the measuring section 9. On the two end regions of the measuring section 9 there are two permanent magnets 10, 11 arranged such that they border the side wall 6 of the bottom rail 3 and the side steel sheet 94 with opposite magnetic poles N and S respectively.

Figure 5:
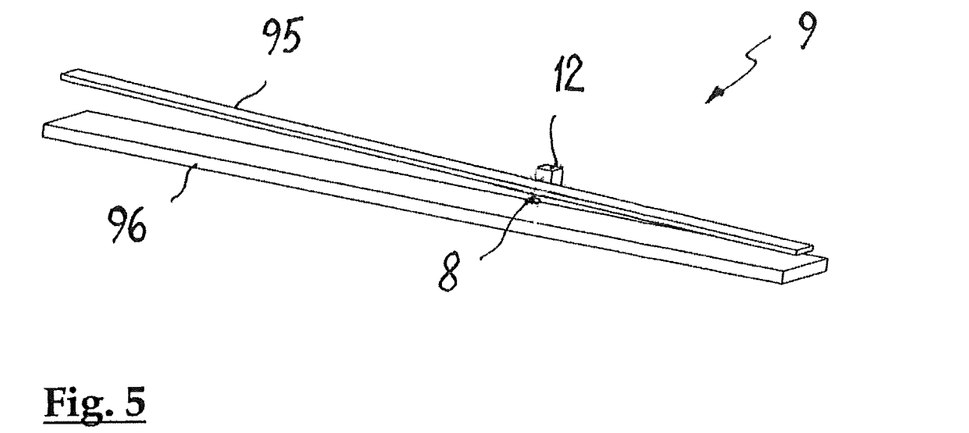
FIG. 5 shows a perspective view of a measuring section of a third exemplary embodiment of the device for detecting the displacement position of a vehicle seat.
Figure 6:
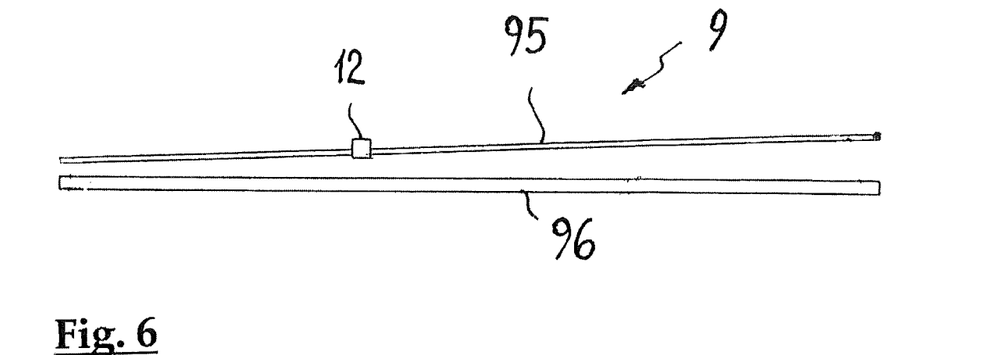
FIG. 6 shows a plan view of the measuring section of the third exemplary embodiment.
Figure 7:
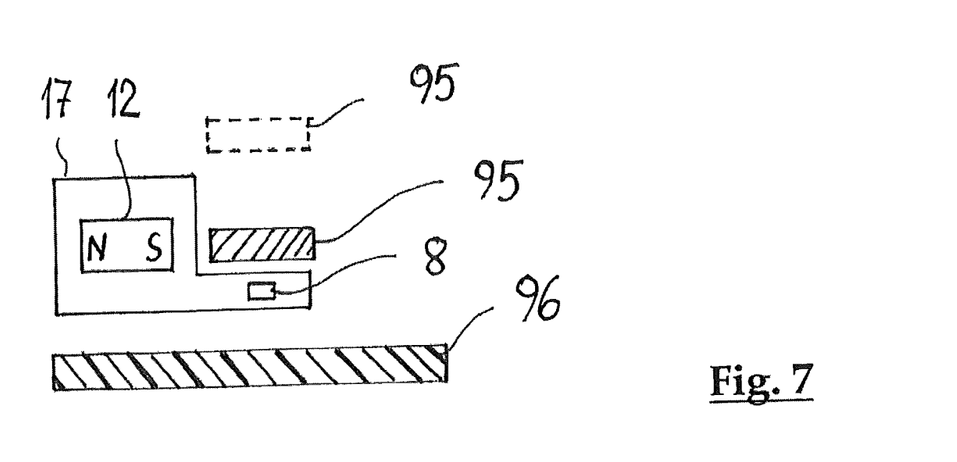
FIG. 7 shows an enlarged schematic of the device according to FIG. 5.

FIG. 5, FIG. 6 and FIG. 7 show schematics of a third version of an exemplary device for detecting the displacement position of a motor vehicle seat. In this version a permanent magnet 12 is located stationary with respect to the Hall sensor 8. For example the Hall sensor 8 and the permanent magnet 12 are accommodated or potted within a common housing 17. They can be arranged for example on a holder analogously to the holder 7 (FIG. 1 and FIG. 4). In this way the Hall sensor 8 and the permanent magnet 12 can be displaced in relative terms jointly along one measuring section 9. One ferromagnetic component is located along the displacement distance of the vehicle seat such that a distance a of the component from the permanent magnet 8 changes essentially continuously along the measuring section 9. The distance a of the ferromagnetic component from the permanent magnet 12 can change in the relative displacement from one end of the measuring section to the other end of the measuring section by for example 7 mm to 15 mm, preferably, for example, by roughly 10 mm. FIG. 7 shows by the broken line the end of the ferromagnetic component on the other end of the measuring section 9 on which the component has the greatest distance from the permanent magnet 12. Continuously changing the distance of the ferromagnetic component from the permanent magnet 8 changes the effect of the component on the characteristic of the magnetic field. Accordingly when the vehicle seat is being displaced the magnetic field strength or the magnetic flux of the magnetic field of the permanent magnet 12 located stationary to the Hall sensor 8 also changes, which magnetic field passes through and encounters the magnetic field-sensitive measurement field of the Hall sensor 8. The absolute value of the magnetic field is detected by the Hall sensor 8 and can be converted into an absolute value of the displacement position of the vehicle seat.

In the exemplary embodiment in FIG. 5 to FIG. 7, the component which influences the magnetic field can be a ferromagnetic sheet 95 which runs along the longitudinal gap of the measuring section and which forms a side boundary for the measuring section 9. The ferromagnetic sheet 95 has a distance from the permanent magnet 12 which changes continuously along the measuring section. The effect of the ferromagnetic sheet 95 changes continuously with increasing or decreasing distance of the sheet 95 from the permanent magnet 12. In this way the magnetic field strength or the magnetic flux is changed by the magnetic field-sensitive measurement surface of the Hall sensor 8. The detected absolute magnetic field strength can be converted directly into information about the absolute displacement position of the vehicle seat.

In one alternative version, the component which influences the magnetic field of the permanent magnet can be formed by the top rail 3 or by the bottom rail 2. The Hall sensor 8 and the permanent magnet 12 which is located stationary with respect to the Hall sensor are then located on the respective other rail (bottom rail 2 or top rail 3) such that when the seat is being adjusted along the measuring section 9 the distance between the permanent magnet 12 and the top rail 3 or the bottom rail 2 changes essentially continuously. To do this, for example along the measuring section there can be a continuously changing, in particular increasing or decreasing, material coating on one outside surface of the top rail 3 or the bottom rail 2, which surface faces the Hall sensor 8 and the permanent magnet 12 which is arranged to be stationary. Alternatively a rail which changes continuously in wall thickness along the measuring section can also be located on the outside surface of the respective rail, which surface faces the Hall sensor and the permanent magnet which is arranged to be stationary.

FIG. 5 to FIG. 7 show that there can also still be a guide rail 96 which runs parallel to the displacement direction, along which the Hall sensor 8 and the stationary permanent magnet 12 can be displaced in relative terms. The guide rail 96 can form a side boundary of the measuring section 9 and consists of a material, for example of a plastic, which does not adversely affect the magnetic field of the permanent magnet.

The preceding description of specific exemplary embodiments is used solely for explanation of exemplary embodiments and should not be regarded as limiting. Rather the invention is defined by the claims and the equivalents which are accessible to those skilled in the art and which are encompassed by the general idea disclosed herein.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for detecting a displacement position of a vehicle seat, comprising:
    monitoring, as the vehicle seat is being displaced, via a magnetic field-sensitive sensor device, a change of one magnetic field component and generating an output signal by the sensor device;
    assessing an adjustment position of the vehicle seat based on the output signal;
    displacing the magnetic field-sensitive sensor device in a vicinity of at least one ferromagnetic component relative to a measuring section which extends parallel to one displacement direction of the vehicle seat and has a length which corresponds at least to a maximum displacement length of the vehicle seat;
    detecting, via the magnetic field-sensitive device, an absolute value of the magnetic field strength of a magnetic field whose magnetic field strength changes essentially continuously along a longitudinal extension of the measuring section, at a position of the measuring section which corresponds to a displacement position of the vehicle seat; and
    converting the detected magnetic field strength into information about an absolute displacement position of the vehicle seat, wherein the magnetic field is generated using two permanent magnets which are located on end regions of the measuring section, the two permanent magnets being aligned such that they border two ferromagnetic components with magnetic poles which are opposite one another, and the detecting is performed via a Hall sensor in a longitudinal gap between the two ferromagnetic components.

2. The method as claimed in claim 1, wherein the Hall sensor has at least one magnetic field-sensitive measurement surface permeated essentially vertically by field lines of the generated magnetic field.

3. The method as claimed claim 2, wherein a measurement signal which has been generated by the sensor device is linearized for the evaluation and assignment of an absolute displacement position of the vehicle seat.

4. The method as claimed in claim 1, wherein the Hall sensor in the displacement of the vehicle seat is displaced relative to a longitudinal extension thereof in the longitudinal gap which is bordered by the two ferromagnetic components formed as two steel sheets, which run essentially parallel to one another and which form side boundaries of the measuring section and are fastened to a top rail or to a bottom rail of a seat rail.

5. The method as claimed in claim 4, wherein the Hall sensor is mounted on the top rail of the seat rail and is displaced as the vehicle seat is being displaced relative to a measuring section which is mounted stationary on the bottom rail of the seat rail.

6. The method as claimed in claim 1, wherein when the vehicle seat is being displaced, the Hall sensor is displaced, relative to a longitudinal extension thereof in the longitudinal gap which is bordered by the two ferromagnetic components formed as a top rail or a bottom rail of a seat rail, and by a ferromagnetic steel sheet, which runs essentially parallel to the top rail or to the bottom rail, the ferromagnetic sheet forming a side boundary for the measuring section.

7. A device for detecting a displacement position of a vehicle seat, the device comprising:
a magnetic field-sensitive sensor device and at least one permanent magnet for generating a magnetic field, whose change along a displacement length of the vehicle seat is detected with the magnetic field-sensitive sensor device to assess an adjustment position of the vehicle seat from an output signal of the sensor device; and
a seat rail having a top rail and a bottom rail, on which there is arranged a measuring section whose length corresponds at least to a maximum displacement length of the vehicle seat, the magnetic field-sensitive sensor device being displaceable relative to a longitudinal extension of the measuring section when the vehicle seat is being displaced, the at least one permanent magnet along the measuring section being arranged for generating a magnetic field along the measuring section with an essentially continuously changing magnetic field strength whose absolute value is detectable at one displacement position by the magnetic field-sensitive sensor device, the absolute value of the magnetic field strength being converted into information about an absolute displacement position of the vehicle seat during operation, wherein the magnetic field-sensitive sensor device is a Hall sensor and on ends of the measuring section there are arranged:
two permanent magnets which are aligned such that they border two ferromagnetic components with magnetic poles which are opposite one another, the two ferromagnetic components bordering a longitudinal gap which forms the measuring section and in which the Hall sensor can be displaced relative to a longitudinal extension thereof.

8. The device as claimed in claim 7, wherein the Hall sensor includes at least one magnetic field-sensitive measurement surface and is located with respect to a magnetic field, which in operation will prevail along the measuring section, such that the magnetic field-sensitive measurement surface is impinged by field lines of the magnetic field essentially vertically.

9. The device as claimed in claim 8, wherein the Hall sensor is mounted on the top rail of the seat rail and the measuring section is located on the bottom rail of the seat rail.

10. The device as claimed in claim 7, wherein that the longitudinal gap is bordered by the two ferromagnetic components formed as two steel sheets which run essentially parallel to one another and which form side boundaries of the measuring section and are fastened to the top rail or to the bottom rail of the seat rail.

11. The device as claimed in claim 7, wherein one of the two ferromagnetic components is formed by the top rail or the bottom rail of the seat rail and the second ferromagnetic component is formed by a ferromagnetic steel sheet, which runs essentially parallel to the top rail or to the bottom rail, the ferromagnetic steel sheet forming a side boundary for the measuring section.

* * * * *